United States Patent [19]

Paz-Pujalt

[11] Patent Number: 5,051,278
[45] Date of Patent: Sep. 24, 1991

[54] METHOD OF FORMING METAL FLUORIDE FILMS BY THE DECOMPOSITION OF METALLO-ORGANIC COMPOUNDS IN THE PRESENCE OF A FLUORINATING AGENT

[75] Inventor: Gustavo R. Paz-Pujalt, Rochester, N.Y.

[73] Assignee: Eastman Kodak Company, Rochester, N.Y.

[21] Appl. No.: 377,646

[22] Filed: Jul. 10, 1989

[51] Int. Cl.$^5$ .............................................. B65D 5/12
[52] U.S. Cl. ..................... 427/108; 427/64; 427/68; 427/126.2; 427/165; 427/168; 427/169; 427/226; 427/240
[58] Field of Search ............... 427/226, 240, 165, 168, 427/169, 64, 68, 108, 126.2

[56] References Cited

U.S. PATENT DOCUMENTS

| | | | |
|---|---|---|---|
| 2,441,668 | 5/1948 | Mathers et al. | 23/88 |
| 3,176,575 | 4/1965 | Socha | 88/1 |
| 3,399,179 | 8/1968 | Grakauskas | 260/92.1 |
| 3,475,192 | 10/1969 | Langley | 117/33.3 |
| 3,850,665 | 11/1974 | Plumat et al. | 427/226 |
| 3,883,214 | 3/1975 | Hoffman | 350/1 |
| 3,991,108 | 11/1976 | Jordan | 260/544 |
| 4,263,335 | 4/1981 | Wagner et al. | 427/110 |
| 4,265,974 | 5/1981 | Gordon | 427/108 |
| 4,420,500 | 12/1983 | Nakatani | 427/108 |
| 4,492,721 | 1/1985 | Joosten et al. | 427/226 |
| 4,545,964 | 10/1985 | Bergez et al. | 423/138 |
| 4,627,865 | 12/1986 | Roba | 65/3.12 |
| 4,731,256 | 3/1988 | Russo et al. | 427/226 |

Primary Examiner—Janyce Bell
Attorney, Agent, or Firm—Paul A. Leipold

[57] ABSTRACT

A method of forming a film of metal fluoride in which there is combined a metallo-organic compound solvent solution and an organic fluoride to form a casting liquid. The casting liquid is then coated by a method such as dip coating or spin coating to form a coating on a substrate. The coated substrate is then heated to decompose the metallo-organic compound and organic fluoride resulting in recovery of a metal fluoride coated substrate. The metal fluorides formed may be fluorides of lithium, sodium, potassium, magnesium, calcium, strontium, or barium, lanthanum, yttrium, or the oxifluoride of europium, erbium and other rare earths.

36 Claims, No Drawings

METHOD OF FORMING METAL FLUORIDE FILMS BY THE DECOMPOSITION OF METALLO-ORGANIC COMPOUNDS IN THE PRESENCE OF A FLUORINATING AGENT

FIELD OF THE INVENTION

The invention relates to a method of providing a layer of metal fluoride or metal oxyfluoride on a substrate. It particularly relates to the formation of a fluorinated metal layer by decomposition of metallo-organic compounds such as metal carboxylates in the presence of a fluorinating agent.

PRIOR ART

Many alkaline earth fluorides have a low refractive index and are therefore suitable as anti-reflective layers on substrates having a higher refractive index. Magnesium fluoride layers are particularly suitable for anti-reflective layers because they have a low refractive index (n=1.38 at a wavelength λ=550 nm), and because they are very resistant to environmental influences and because hard layers are formed which can withstand polishing and resist scratching. Moreover, magnesium fluoride layers show only a small reflection when the thickness of the layer is a quarter of the wavelength of the light in the center of the visible spectrum (λ=550 nm).

Metal fluorides are also useful as phosphors to change the wavelength of light emitted by lasers. Phosphors suitable are yttrium fluoride and alpha sodium yttrium fluoride doped with ytterbium and erbium.

Metal fluoride layers are often provided by vapor deposition in a vacuum. For large substrates this method is cumbersome and involves high costs. Moreover, strongly curved surfaces and, for example, the insides of tubes cannot be coated with a uniform layer by vapor deposition in a vacuum. Important substrates on which anti-reflective layers according to the invention can be provided are various types and shapes of glass, for example, soda-lime glass, various optical glasses, quartz glass and single crystal substrates.

A method of providing metal fluoride layers is described in U.S. Pat. No. 3,475,192-Langley. In this method the substrate is coated with a solution of magnesium fluoride in a polar organic solvent, after which the substrate is heated to a temperature between 100° and 1000° C., preferably between 400° and 800° C. In this method it is necessary to add a film forming vehicle to the solution so as to obtain a layer of an optically good quality. Said film forming vehicle must be fired in the thermal treatment for which a temperature between 400° and 800° C. may haze the magnesium fluoride layer formed.

It has been proposed in U.S. Pat. No. 4,492,721-Joosten et al that magnesium fluoride layers be formed by decomposition of fluorinated organic magnesium compounds such as magnesium trifluoroacetate. However, the preparation of fluorinated metal salts is difficult and therefore the materials for the Joosten et al method are expensive. Furthermore, magnesium trifluoro acetate is toxic and its inhalation may result in severe injury. Further, the method is not believed suitable for all of the wide variety of metals that would be desirable as metal fluorides.

Therefore there remains a need for a low cost process of producing thin films of metal fluorides without vacuum deposition techniques and without formation of expensive precursors. Further, there is a need to deposit in a convenient and effective manner mixed fluorides of varied stoichiometries to create coatings with unique properties. Deposition of such mixed metal fluorides is difficult by vapor deposition techniques.

THE INVENTION

The invention provides a method of forming a film of metal fluoride in which there is combined a solution of a non-fluorine-containing metallo-organic compound and an organic fluoride to form a casting liquid. The casting liquid is then coated by a method such as dip coating or spin coating on to a substrate. The coated substrate is then heated to decompose the non-fluorine-containing metallo-organic compound and organic fluoride resulting in recovery of a metal fluoride coated substrate. The preferred metal fluorides formed are fluorides of lithium, lanthanum, magnesium, calcium, barium, or oxyfluorides of transition series elements.

MODES OF PERFORMING THE INVENTION

The invention has numerous advantages over prior practices. The vapor deposition technique requires high temperatures for vaporization of the metal fluoride expensive containers for vapor deposition, such as tantalum boats, and further utilizing vapor deposition it is difficult to form mixtures with a given stoichiometry of different vapor deposited metals. A process such as Joosten et al has a disadvantage that fluorinated metal salts must first be formed and then deposited prior to decomposition and formation of the magnesium fluoride. The Joosten et al technique is expensive in that the magnesium salts are expensive and difficult to synthesize, and magnesium trifluoroacetate is extremely toxic and, therefore, the technique is not suitable for a wide range of different metal fluorides or for mixtures of metals forming mixed metal fluoride coatings.

Coating by dip coating or spin coating as in the invention allows the coating of irregular shapes that do not coat well with vapor deposition. These and other advantages will be apparent from the following detailed description.

Pure metal carboxylates decompose to give the metal carbonate which subsequently decomposes into the metal oxide, and the corresponding ketone which decomposes following a mechanism suitable to its own properties. Meanwhile, fluorinated carboxylates give upon heating, a mixture of fluorocarbons such as $C_3F_7CFO$, $C_2F_6$, $(C_3F_7CO)_2O$, and $COF$; and further pyrolysis of these gives $HF$, $F_2$, and $CHF_3$. The formation of metal fluorides is thought to occur as a result of the reaction of the $HF$, $F_2$, and $CHF_3$ fluorinating agents, which are produced in situ, with the decomposition products of metal carboxylates and fluorocarboxylates:

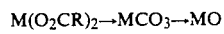

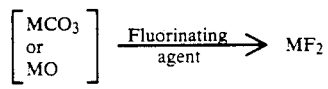

The fluorinating agent coordinates to the metal in question so as to remain in the reaction region at temperatures beyond the boiling point where fluorine-containing pyrolysis products are given off.

The invention is generally performed by dissolving non-fluorine-containing metallo-organic compound in a solvent and adding a fluorinating agent, such as fluorinated carboxylic acid, to the solvent solution. Typically the organic fluoride is a liquid however it is possible that the organic fluoride may be dissolved in the same or a different solvent than the non-fluorine-containing metallo-organic compound prior to mixing with the metal precursor solution. The solvent metal carboxylate solution and organic fluoride are mixed to obtain a casting liquid. The casting liquid is coated onto a suitable substrate by any conventional method such as spin coating, dip coating, or spray coating. The coating and substrate are then heated to decompose the metal carboxylate and organic fluoride to form a metal fluoride coat on the substrate.

The process may be performed with any non-fluorine-containing metallo-organic compound that upon thermal decomposition results in formation of an inorganic form of the metal that is a metallic state metal, metal oxide, or metal carbonate. Suitable non-fluorine-containing metallo-organic compounds include metal carboxylates, metal alkoxides, and metal acetylacetonates all mixed with acid such that rheology is adjusted. The term "metallo-organic" as used here means metal in combination with organic ligands. The preferred carboxylates are carboxylates of the Group 1 metals lithium, sodium and potassium, and the Group 2 metals magnesium, calcium, strontium, and barium. These carboxylate materials are preferred as they produce the best casting coatings for metal fluorides. The nature of the product after heating is determined by the free energy of formation of products. Thus, pure metal fluorides form the more electropositive metals such as the Group 1 and Group 2 metals listed above. When transition elements are utilized in the process because of their more intermediate electropositivity, it is expected that the metal fluorides would also be mixed with the metal oxy fluorides in the product obtained.

Any organic fluorinating agent may be utilized that when mixed with the solvent solution of metallo-organic non-fluorine-containing metal compound stays in solution without a disruptive reaction, and when heated on a substrate gives off fluorinated gases that result in the formation of metal fluoride. Suitable fluorinating agents are trifluoroacetylacetone, heptafluoroacetylacetone, alkanoyl fluorides, fluoroalkanoic and generally any of the fluoro compounds that upon decomposition or pyrolysis produce fluorine substituted alcohols, hydrocarbons, metal carboxylates, and alkoxides that upon further decomposition or pyrolysis produce fluorine, hydrogen fluoride, and $COF_2$. Preferred fluorinating agents are fluorinated carboxylic acids such as fluorobutyric acid. Fluorobutyric acid is particularly preferred as it is low in cost and readily available. The fluorinated carboxylic compounds preferred to be utilized in the invention decompose upon heating to hydrogen fluoride gas, fluorine gas and $COF_2$ gas. These fluorine-containing gaseous materials react with the preferred metal carboxylate or other non-fluorine-containing metallo-organic compound to produce the metal fluoride during heating.

The heating of the substrate onto which the casting liquid is cast generally is to about 500° C. for decomposition of the products to result in the purest metal fluoride. The substrate containing the casting liquid may be heated at any suitable rate. A preferred rate is about 50° C. per minute for uniform coats of the metal fluoride film.

The solvent, to dissolve the non-fluorine-containing metallo-organic compound, may be any material that does not react with the metallo-organic compound or the fluorinating agent in a disruptive manner, i.e., gelling, forming precipitates, or separating. Typical of such solvents are benzene, toluene, butanol, 2-ethylhexanoic, and neodecanoic. A preferred solvent for the preferred metallo-organic carboxylates is toluene, as it is low in cost and offers desirable coating advantages due to its surface tension and viscosity of casting liquids formed. The solvent utilized must be able to dissolve the metal carboxylates such as resinates, 2-ethylhexanoates, neodecanoates, as well as the alkoxides and acetylacetonates.

The coating technique utilized to form a layer of the casting liquid may be anything that will give a thin coat on a particular substrate. These include spraying, doctor blade coating, and curtain coating. Preferred methods are spin coating and dip coating. In spin coating a liquid is applied to a substrate which is then spun at a high rate of rpms such as 6000 rpm. In dip coating the substrate is dipped into liquid and allowed to drain prior to heating. Spin coating results in very uniform thin coatings.

The substrate onto which the casting solution is placed may be any substrate on which a metal fluoride coat would be useful. The material must be able to withstand the 500° C. formation temperature of the coating. Among suitable substrates is aluminum oxide. The aluminum oxide may be in the form of sapphire which when coated with various metal fluorides will exhibit different laser wavelengths when utilized as a laser crystal.

The following examples are intended to be illustrative and not exhaustive of techniques in accordance with the invention. Parts and percentages are by weight unless otherwise indicated.

FORMATION OF METAL CARBOXYLATE FOR EXAMPLES

Calcium Carboxylate
- 10 g $CaCo_3$
- Excess 2-ethylhexanoic, heat with stirring at reflux conditions for 18 h. After filtration thermogravimetric analysis (TGA) showed 4.58% CaO residue at 700° C.

Magnesium Carboxylate
- 2.35 g MgO
- 15.8 g 2-Ethylhexanoic
- 30 ml Toluene
- A slurry of MgO/toluene is added slowly to the warmed up (about 100° C.) acid with stirring. After filtration and TGA a residue of 2.99% MgO is found.

Lithium Carboxylate
- 2 g Lithium hydroxide
- 12 g 2-Ethylhexanoic
- 24 ml Toluene
- Add slurry of LiOH/toluenes to warmed acid (about 100°°C.) while stiring make sure reflux conditions are present so as to remove $H_2O(g)$ vapor. After filtration and drying with molecular silver TGA showed 2.33% $Li_2CO_3$ residue at 700° C.

Barium Carboxylate

Obtained commercially as Ba-Resinate from Engelhard ™ (a carboxylate of a naturally occurring acid).

Lanthanum Carboxylate
1.04 g La-Acetate
6.93 g Neodecanoic
Warm up until complete dissolution/reaction (transcarboxylation) is indicated by bubbling and evolution of acetic acid.

Yttrium Carboxylate
1.92 g Y-Acetate
5.56 g Neodecanoic
Warm up until complete dissolution/reaction (transcarboxylation) is indicated by bubbling and evolution of acetic acid.

Europium Carboxylate
1.43 g Europium Acetate
7.25 g Neodecanoic
Warm up until complete dissolution/reaction (transcarboxylation) is indicated by bubbling and evolution of acetic acid.

Erbium Carboxylate
1.23 g Er-acetate
4.22 g Neodecanoic
Warm up until complete dissolution/reaction (transcarboxylation) is indicated by bubbling and evolution of acetic acid.

EXAMPLES

Example 1—Calcium Fluoride 1.80 g of Ca-carboxylate
0.8 g Heptafluorobutyric acid ($C_4F_7OH$)

Mixing of the precursor and fluorinating agent is carried out by placing the materials in a bottle, closing the bottle and shaking. An alliquot consisting of ~½ ml of the mixture is deposited on a sodalime glass substrate by a Pasteur pipette. After spin coating at 6K rpm for 30 sec. the sodalime substrate and spin coated mixture are treated by being placed on a hot plate held at a temperature of 600° C. The residue is identified as calcium fluoride by X-ray difraction.

Example 2—Magnesium Fluoride 2.14 g Mg-precursor
2.80 g $C_4F_7O_2H$

The procedure of Example 1 is repeated substituting the above magnesium carboxylate. After decomposition powder x-ray diffraction showed that the inorganic material obtained was single phase magnesium fluoride. The x-ray spectrum was matched against the Joint Committee on Powdered Diffraction Standards (JCPDS) files to confirm the identity of the fluoride.

Example 3—Lithium Fluoride 3.35 g Li-precursor
0.34 g $C_4F_7O_2H$

The procedure of Example 1 is repeated substituting the above Ca carboxylate. After decomposition powder x-ray diffraction showed that the inorganic material obtained was single phase lithium fluoride. The x-ray spectrum was matched against the Joint Committee on Powdered Diffraction Standards (JCPDS) files to confirm the identity of the fluoride.

Example 4—Barium Fluoride 1.87 g Ba-resinate Engelhard
1.94 g $C_4F_7O_2H$

The procedure of Example 1 is repeated substituting the above barium carboxylate. After decomposition powder x-ray diffraction showed that the inorganic material obtained was single phase barium fluoride. The x-ray spectrum was matched against the Joint Committee on Powdered Diffraction Standards (JCPDS) files to confirm the identity of the fluoride.

Example 5—Lanthanum Fluoride 1.66 g La-carboxylate
1.94 g $C_4F_7O_2H$

The procedure of Example 1 is repeated substituting the above lanthanum carboxylate. After decomposition powder x-ray diffraction showed that the inorganic material obtained was single phase lanthanum fluoride. The x-ray spectrum was matched against the Joint Committee on Powdered Diffraction Standards (JCPDS) files to confirm the identity of the fluoride.

Example 6—Yttrium Fluoride-Lithium Fluoride 0.75 g Li-carboxylate (0.44% Li)
0.68 g Y-carboxylate (6.22% Y)
1.2 g $C_4F_7O_2H$ The procedure of Example 1 is repeated substituting the above lithium and yttrium carboxylate. After decomposition powder x-ray diffraction showed that the inorganic material obtained was single phase dimetallic yttrium fluoride-lithium fluoride. The x-ray spectrum was matched against the Joint Committee on Powdered Diffraction Standards (JCPDS) files to confirm the identity of the fluoride.

Example 7—Europium Oxifluoride 2.70 g Eu-carboxylate
0.26 g $C_4F_7O_2H$

The procedure of Example 1 is repeated substituting the Europium carboxylate. After decomposition powder x-ray diffraction showed that the inorganic material obtained was single phase europium oxifluoride. The x-ray spectrum was matched against the Joint Committee on Powdered Diffraction Standards (JCPDS) files to confirm the identity of the fluoride.

Example 8—Magnesium Fluoride 0.39 g Magnesium acetylacetonate (MgAcAc)
2 g 2-ethylhexanoic
1.71 g Xylene
1.10 g Heptafluorobutyric acid After mixing the ingredients, they were heated in a hot stage until complete dissolution of the Mg(AcAc) occurred. After decomposition powder x-ray diffraction showed that the inorganic material obtained was single phase magnesium fluoride. The x-ray spectrum was matched against the Joint Committee on Powdered Diffraction Standards (JCPDS) files to confirm the identity of the fluoride.

Example 9—Lanthanum Fluoride 0.4 g La-isoproponide
1.2 g Neodecanoic
1.87 g Xylene Heat to reflux conditions until the isopropoxide dissolves. Filter to discard undissolved La-isopropoxide. Add heptafluorobutyric acid. After decomposition powder x-ray diffraction showed that the inorganic material obtained was single phase lanthanum fluoride. The x-ray spectrum was matched against the Joint Committee on Powdered Diffraction Standards (JCPDS) files to confirm the identity of the fluoride.

The invention has been described in detail with particular reference to preferred embodiments thereof, but it will be understood that variations and modifications can be effected within the spirit and scope of the invention.

I claim:

1. A method of forming a film of metal fluoride comprising combining a non-fluorine-containing metallo-organic compound, solvent, and a fluorinating agent to form a casting liquid, forming a coating of said casting liquid on a substrate, and heating said coating and said substrate wherein the metal of said metallo-organic compound comprises at least one of lithium, sodium, potassium, magnesium, calcium, strontium, barium, yttrium, europium, and rare earths.

2. The method of claim 1 wherein the metal of said metallo-organic compound comprises at least one of lithium, sodium, potassium, magnesium, calcium, strontium, barium, yttrium, europium, and rare earths.

3. The method of claim 1 wherein fluorinating agent comprises a fluorinated carboxylic acid.

4. The method of claim 3 wherein said fluorinated carboxylic acid comprises fluorobutyric acid.

5. The method of claim 1 wherein said fluorinating agent comprises at least one of trifluoroacetylacetone, heptafluoroacetylacetone, fluoroacetic acid, boron trifluoride, alkanoyl fluorides, and fluoroalkanoic anhydrides.

6. The method of claim 1 wherein said forming a coating comprises spin coating onto a substrate.

7. The method of claim 1 wherein said forming a coating comprises dip coating onto a substrate.

8. The method of claim 1 wherein said heating is to at least about 500° C. to form said metal fluoride.

9. The method of claim 1 wherein said substrate comprises a glass.

10. The method of claim 1 wherein said substrate comprises a laser crystal.

11. The method of claim 1 wherein said metallo-organic compound is selected from the group that consists essentially of a metal carboxylates, metal akoxides, metal acetylacetonates, and mixtures thereof.

12. A method of forming a film of metal fluoride comprising combining a non-fluorine-containing metallo-organic compound comprising metal carboxylate, solvent, and a fluorinating agent to form a casting liquid, forming a coating of said casting liquid on a substrate, and heating said coating and said substrate to decompose said metallo-organic compound and decompose said fluorinating agent whereby the decomposition products of said metallo-organic compound and said fluorinating agent react to form a metal fluoride coating.

13. The method of claim 12 wherein the metal of said metallo-organic compound comprises at least one of lithium, sodium, potassium, magnesium, calcium, strontium, barium, yttrium, europium, and rare earths.

14. The method of claim 12 wherein fluorinating agent comprises a fluorinated carboxylic acid.

15. The method of claim 14 wherein said fluorinated carboxylic acid comprises fluorobutyric acid.

16. The method of claim 12 wherein said fluorinating agent comprises at least one of trifluoroacetylacetone, heptafluoroacetylacetone, fluoroacetic acid, boron trifluoride, alkanoyl fluorides, and fluoroalkanoic anhydrides.

17. The method of claim 12 wherein said heating is to at least about 500° C. to form said metal fluoride.

18. A method of forming a film of metal fluoride comprising combining a non-fluorine-containing metallo-organic compound comprising metal alkoxide, solvent, and a fluorinating agent to form a casting liquid, forming a coating of said casting liquid on a substrate, and heating said coating and said substrate to decompose said metallo-organic compound and decompose said fluorinating agent whereby the decomposition products of said metallo-organic compound and said fluorinating agent react to form a metal fluoride coating.

19. The method of claim 18 wherein the metal of said metallo-organic compound comprises at least one of lithium, sodium, potassium, magnesium, calcium, strontium, barium, yttrium, europium, and rare earths.

20. The method of claim 18 wherein fluorinating agent comprises a fluorinated carboxylic acid.

21. The method of claim 20 wherein said fluorinated carboxylic acid comprises fluorobutyric acid.

22. The method of claim 18 wherein said fluorinating agent comprises at least one of trifluoroacetylacetone, heptafluoroacetylacetone, fluoroacetic acid, boron trifluoride, alkanoyl fluorides, and fluoroalkanoic anhydrides.

23. The method of claim 18 wherein said heating is to at least about 500° C. to form said metal fluoride.

24. A method of forming a film of metal fluoride comprising combining a non-fluorine-containing metallo-organic compound comprising metal acetylacetonate, solvent, and a fluorinating agent to form a casting liquid, forming a coating of said casting liquid on a substrate, and heating said coating and said substrate to decompose said metallo-organic compound and decompose said fluorinating agent whereby the decomposition products of said metallo-organic compound and said fluorinating agent react to form a metal fluoride coating.

25. The method of claim 24 wherein the metal of said metallo-organic compound comprises at least one of lithium, sodium, potassium, magnesium, calcium, strontium, barium, yttrium, europium, and rare earths.

26. The method of claim 24 wherein fluorinating agent comprises a fluorinated carboxylic acid.

27. The method of claim 24 wherein said fluorinated carboxylic acid comprises fluorobutyric acid.

28. The method of claim 24 wherein said fluorinating agent comprises at least one of trifluoroacetylacetone, heptafluoroacetylacetone, fluoroacetic acid, boron trifluoride, alkanoyl fluorides, and fluoroalkanoic anhydrides.

29. The method of claim 24 wherein said heating is to at least about 500° C. to form said metal fluoride.

30. A method of forming a film of metal fluoride comprising combining a non-fluorine-containing metallo-organic compound, solvent, and a fluorinating agent to form a casting liquid, forming a coating of said casting liquid on a substrate, and heating said coating and said substrate wherein said fluorinating agent comprises at least one of trifluoroacetylacetone, heptafluoroacetylacetone, fluoroacetic acid, boron trifluoride, alkanoyl fluorides, and fluoroalkanoic anhydrides.

31. The method of claim 30 wherein the metal of said metallo-organic compound comprises at least one of lithium, sodium, potassium, magnesium, calcium, strontium, barium, yttrium, europium, and rare earths.

32. The method of claim 30 wherein fluorinating agent comprises a fluorinated carboxylic acid.

33. The method of claim 32 wherein said fluorinated carboxylic acid comprises fluorobutyric acid.

34. The method of claim 30 wherein said heating is to at least about 500° C. to form said metal fluoride.

35. The method of claim 30 wherein said substrate comprises a laser crystal.

36. The method of claim 30 wherein said metalloorganic compound is selected from the group that consists essentially of a metal carboxylates, metal akoxides, metal acetylacetonates, and mixtures thereof.

* * * * *